United States Patent
Singh

(10) Patent No.: US 9,657,702 B2
(45) Date of Patent: May 23, 2017

(54) APPARATUS FOR CONTROLLING THE LIFT OF A VALVE MEMBER

(71) Applicant: WESTPORT POWER INC., Vancouver (CA)

(72) Inventor: Ashish Singh, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 65 days.

(21) Appl. No.: 14/777,430

(22) PCT Filed: Mar. 11, 2014

(86) PCT No.: PCT/CA2014/050213
§ 371 (c)(1),
(2) Date: Sep. 15, 2015

(87) PCT Pub. No.: WO2014/138971
PCT Pub. Date: Sep. 18, 2014

(65) Prior Publication Data
US 2016/0010611 A1   Jan. 14, 2016

(30) Foreign Application Priority Data

Mar. 15, 2013  (CA) .................................... 2809249

(51) Int. Cl.
*F16K 31/10*   (2006.01)
*F02M 63/00*   (2006.01)
(Continued)

(52) U.S. Cl.
CPC .... *F02M 63/0017* (2013.01); *F02M 51/0617* (2013.01); *F02M 51/0689* (2013.01);
(Continued)

(58) Field of Classification Search
CPC ............... F02M 63/0017; F02M 61/08; F02M 63/0033; F02M 51/0617; F02M 61/161;
(Continued)

(56) References Cited

U.S. PATENT DOCUMENTS 1,822,668 A * 9/1931 Protzeller ........... F16K 31/0655
  251/285
2,587,538 A * 2/1952 Seaman ............... F16K 31/0655
  251/129.18
(Continued)

FOREIGN PATENT DOCUMENTS

CN       1327515 A    12/2001
CN    101861487 A    10/2010
(Continued)

OTHER PUBLICATIONS

International Search Report mailed May 28, 2014, for corresponding International Application No. PCT/CA2014/050213, 2 pages.
(Continued)

*Primary Examiner* — John Bastianelli
(74) *Attorney, Agent, or Firm* — Seed IP Law Group LLP

(57) ABSTRACT

An apparatus for controlling the lift of a valve member in a flow control valve comprises an end stop assembly having at least two pieces, a plunger with one end interposed between these pieces and biasing members that urge the pieces into contact with the plunger. The plunger is movable by an actuator to thereby move the pieces of the end stop assembly from a first position in which the pieces of the end stop assembly form a first surface for contacting the valve member to a second position in which the pieces form a second surface that comes into contact with the valve member when the valve member is lifted from its seated position, to thereby allow different discrete lifts of the valve member.

20 Claims, 9 Drawing Sheets

(51) Int. Cl.
    *F16K 1/52*          (2006.01)
    *F16K 31/08*        (2006.01)
    *F02M 51/06*        (2006.01)
    *F02M 61/16*        (2006.01)
    *F02M 61/08*        (2006.01)

(52) U.S. Cl.
    CPC .......... *F02M 61/08* (2013.01); *F02M 61/161* (2013.01); *F02M 63/0033* (2013.01); *F16K 1/523* (2013.01); *F16K 31/082* (2013.01); *F16K 31/10* (2013.01); *F02M 2200/702* (2013.01)

(58) Field of Classification Search
    CPC .......... F02M 51/0689; F02M 2200/702; F16K 31/10; F16K 1/523; F16K 1/52; F16K 31/08; F16K 31/082; F16K 31/084; F16K 31/086
    USPC .............. 251/129.2, 129.15, 129.18, 285, 65
    See application file for complete search history.

(56) References Cited

U.S. PATENT DOCUMENTS

| | | | | |
|---|---|---|---|---|
| 2,930,404 | A * | 3/1960 | Kowalski | F16K 27/0263 251/285 |
| 3,074,686 | A * | 1/1963 | Cain | F16K 35/16 251/129.2 |
| 3,373,943 | A * | 3/1968 | Roosa | F02M 61/16 239/533.11 |
| 4,884,720 | A * | 12/1989 | Whigham | B67D 1/0037 251/285 |
| 6,066,912 | A | 5/2000 | Fitzner et al. | |
| RE37,633 | E | 4/2002 | Fuseya | |
| 6,892,956 | B2 | 5/2005 | Yildirim et al. | |
| 6,994,312 | B2 * | 2/2006 | Pauer | F02M 63/0015 251/285 |
| 8,413,638 | B2 | 4/2013 | Mumford et al. | |
| 2003/0160202 | A1 | 8/2003 | Boecking | |
| 2003/0183793 | A1 | 10/2003 | Boecking | |

FOREIGN PATENT DOCUMENTS

| | | |
|---|---|---|
| DE | 1 911 827 A | 9/1970 |
| GB | 2 341 893 A | 3/2000 |
| JP | 2007224828 A | 9/2007 |

OTHER PUBLICATIONS

Chinese Office Action, dated Nov. 4, 2016, for Chinese Application No. 2014800147146, 4 pages. (with English Translation).

Extended European Search Report, dated Sep. 21, 2016, for European Application No. 14764841, 6 pages.

\* cited by examiner

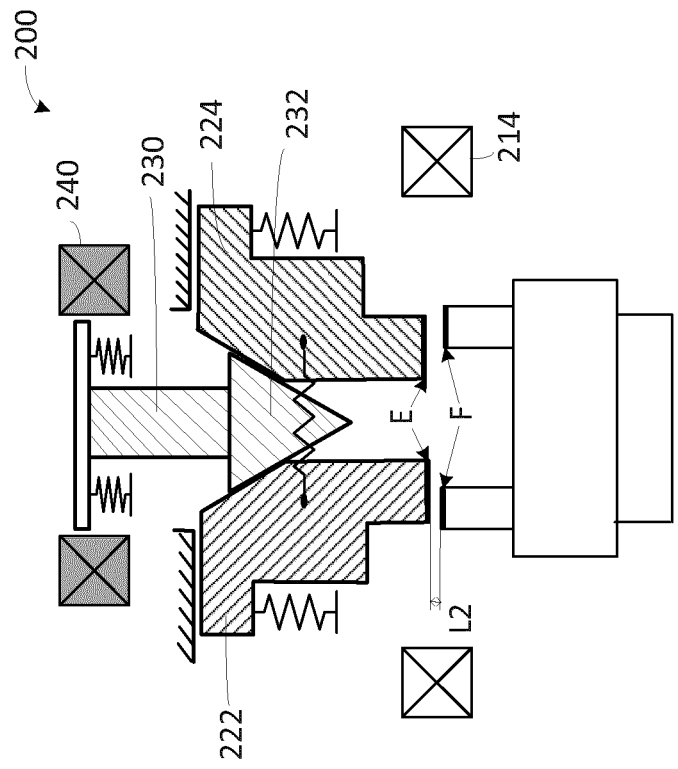
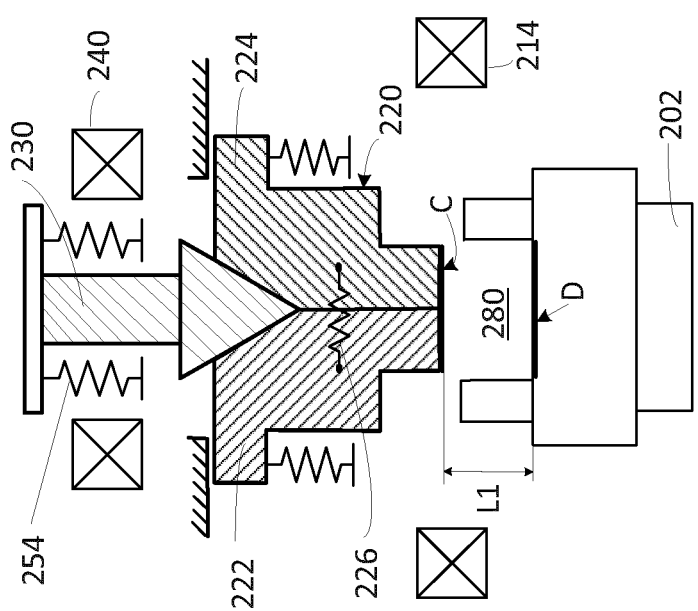
FIGURE 3A
FIGURE 3B

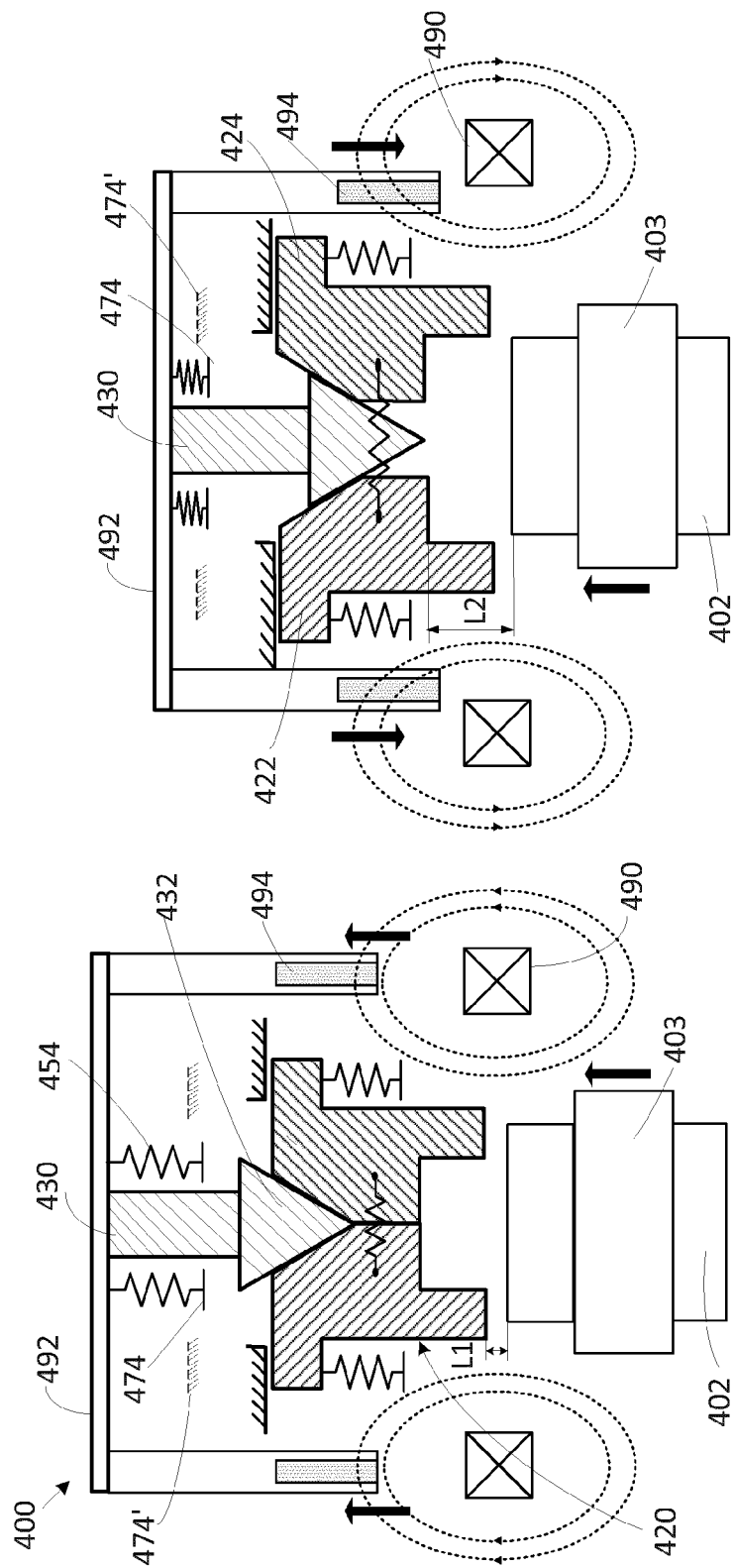

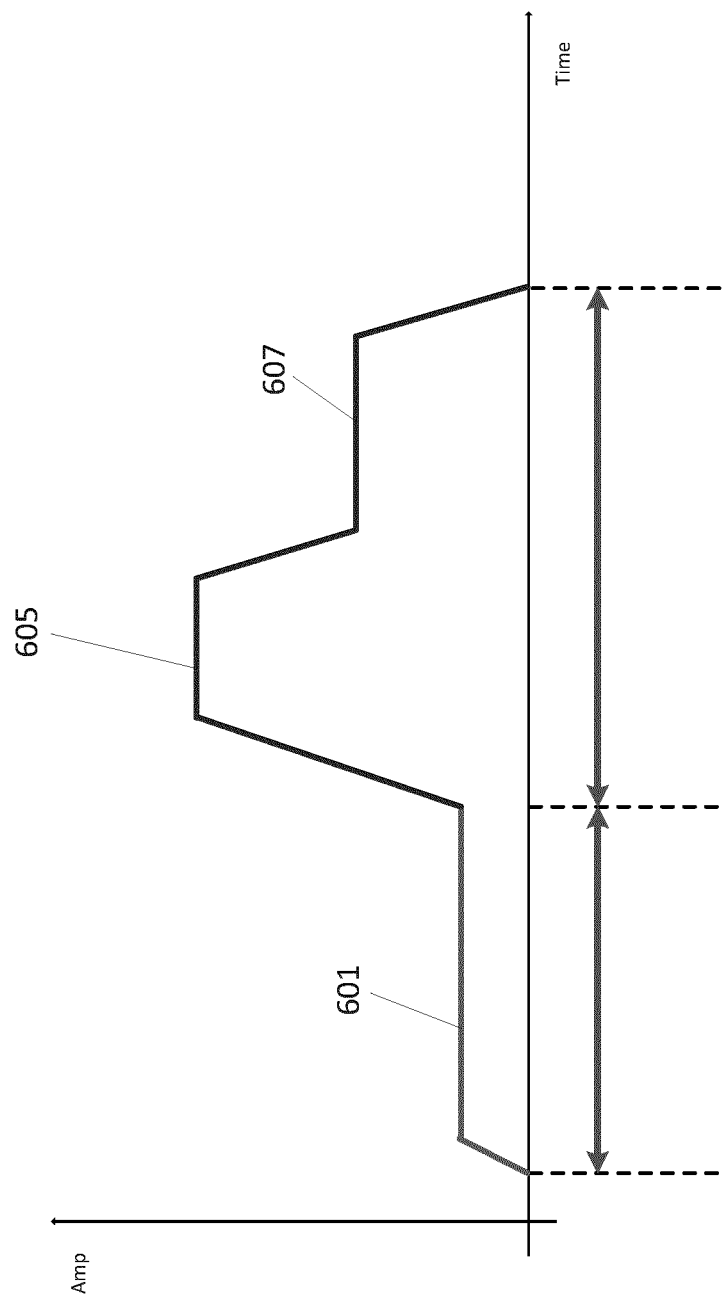

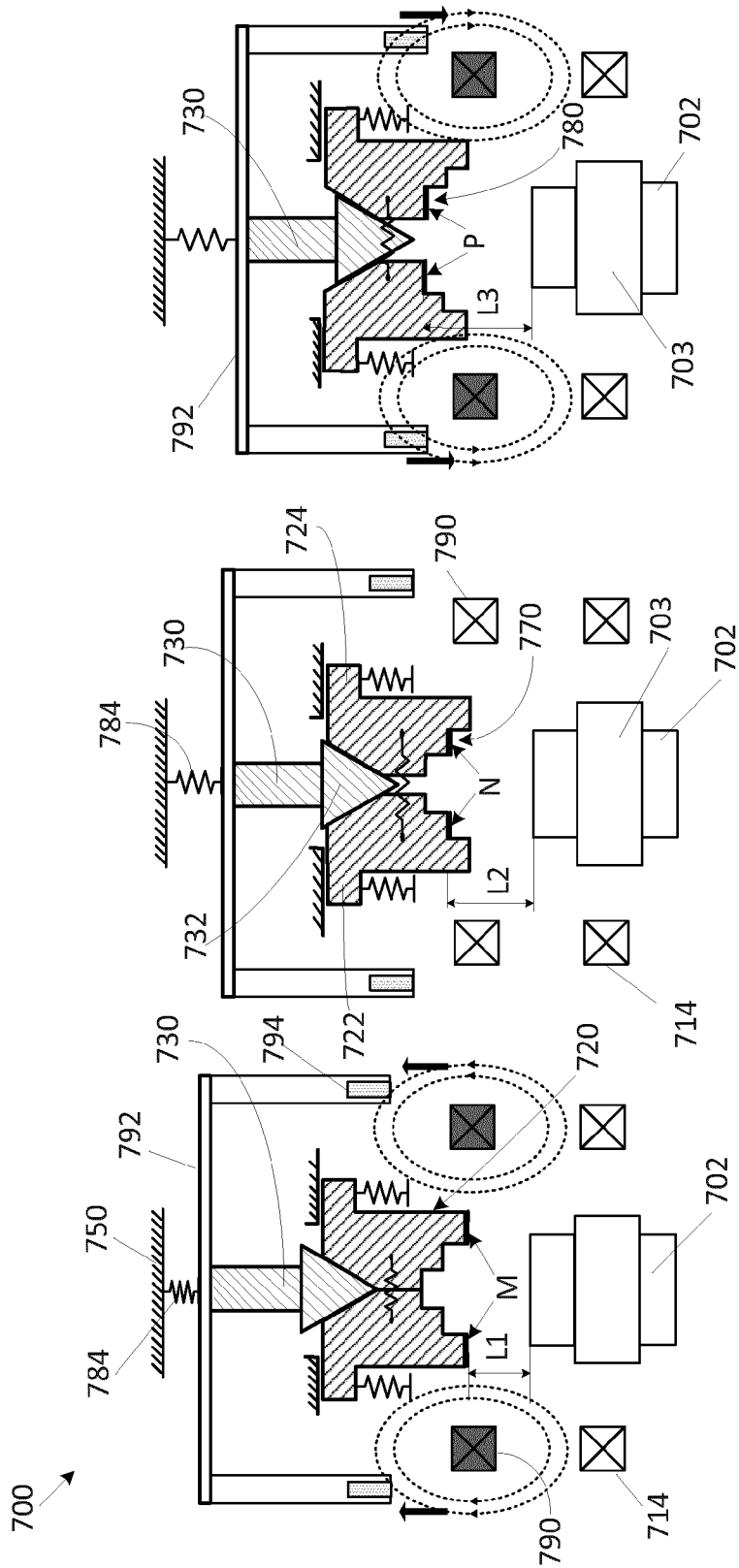

APPARATUS FOR CONTROLLING THE LIFT OF A VALVE MEMBER

TECHNICAL FIELD

The present invention relates to a flow control valve, more specifically to a fuel injection valve, and an apparatus for controlling the lift of a valve member from a closed position to an open position.

BACKGROUND OF THE INVENTION

Flow control valves are valves that control the flow of a fluid such that the fluid flow rate of the fluid exiting the valve outlet can be adjusted between a minimum value and a maximum value by lifting a valve member from its seated position. An example of such a flow control valve is a fuel injection valve which delivers fuel into the combustion chamber of an engine by injection into the intake port of the engine cylinder or directly into the combustion chamber. Typically a liquid fuel like diesel or gasoline has been used for fuelling such compression ignition internal combustion engines, and more recently, cleaner burning gaseous fuels such as natural gas, pure methane, ethane, liquefied petroleum gas, lighter flammable hydrocarbon derivatives, hydrogen, or blends of such fuels have been used as substitutes of diesel or gasoline.

Some types of fuel injection valves can control valve member lift to adjust the quantity of fuel that is introduced into the combustion chamber according to the operational state of the engine. The "valve member lift" is defined herein as the displacement of the valve member away from a closed/seated position to an open position in which fuel is delivered through the fuel injection valve into the combustion chamber. When the pressure of the fuel delivery to the fuel injection valve is constant, and the opening between the valve member and the valve seat is the choke point in the fuel flow path, an increase in valve member lift generally corresponds to an increase in the quantity of fuel being injected by increasing the flow rate through the opening between the valve member and the valve seat. This is beneficial for the engine operation because, when the engine is idling, or at low loads, a smaller amount of fuel is required for operating the engine compared to when the engine is operating at high loads and the amount of fuel injected into the combustion chamber needs to be increased to match the increased power requirements.

An example of such fuel injection valves with an adjustable valve member lift are fuel injection valves actuated by a piezoelectric actuator. Piezoelectric actuators are known in the industry to allow control of the valve member lift at intermediate positions between the fully closed and the fully open positions of the valve. With piezoelectric, magnetostrictive and other strain-type actuators, because actuator displacement is a function of actuator length and there are practical dimensional limits for the size of the actuator, a much smaller valve member lift is achieved with such actuators compared to electromagnetic actuators. Accordingly, in some cases, strain-type actuators might not be sufficient for delivering the amount of fuel required for the optimum engine operation at high loads.

An electromagnetic actuator, for example a solenoid, is typically employed when bigger displacements of valve needles are needed. Some of the prior art patent literature discloses the use of solenoid actuators for achieving different valve member lifts. For example, United Kingdom patent application number 2,341,893 describes an assembly of two actuators that permits the lifting of the valve member to a first intermediate position governed by the stroke of the first electromagnetic actuator, a second intermediate position governed by the stroke of the second electromagnetic actuator and a fully lifted position achieved by the combined strokes of the first and second actuators.

Another solution for controlling the lift of the valve member of a flow control valve can be to limit the movement of the valve member by providing an end stop that comes into contact with valve member when the latter is moved into its lifted position. An example of such an arrangement is described in German patent application number 1911827 which employs an electromagnetically actuated end stop for limiting the movement of the valve member. The end stop is moved by the magnetic force of the electromagnet against the force of a spring which keeps the end stop in contact with the valve member and this allows the movement of the valve member over a predetermined lift which corresponds to the travel distance of the end stop. A disadvantage of such an arrangement is that the movement of valve member is not as precise as desired because of the oscillations introduced by the spring acting on the end stop when the valve member comes into contact with the end stop. As discussed in this patent application, these oscillations can be diminished by choosing a spring with a larger elastic constant.

While other solutions for achieving a variable lift of a valve member in a flow control valve have been achieved by using piezoelectric or magnetostrictive actuators or hydraulic or mechanic actuators, such solutions are more complex requiring a more precise control of the actuator.

While the solutions from the prior art mentioned above allow holding the valve member of a flow control valve at a few intermediate positions between the closed and open position there is still a need for a more simple and accurate solution for lifting the valve member of a flow control valve at discrete lift positions.

SUMMARY

An apparatus is disclosed for controlling the lift of a valve member in a flow control valve. The apparatus comprises an end stop assembly having one side that faces the valve member. The end stop assembly comprises two pieces, a plunger with one end interposed between the pieces and biasing members urging the pieces into contact with the plunger. The plunger is actuated by an actuator to move the pieces of the end stop assembly from a first position to a second position, wherein in the first position the pieces of the end stop assembly form a first surface that comes into contact with the valve member to allow a first lift L1 of the valve member when the valve member is lifted from its seated position and, in the second position, the pieces of the end stop assembly form a second surface that comes into contact with the valve member to allow a second lift L2 of the valve member when the valve member is lifted from its seated position.

In another embodiment of the apparatus for controlling the lift of the valve member, the plunger is actuated to move the pieces of the end stop assembly to at third position in which the pieces form a third surface that comes into contact with the valve to allow a third lift L3 of the valve member when the valve member is lifted from its seated position.

In one preferred embodiment, the apparatus for controlling the valve member lift comprises two pieces which each have an inwardly stepped end on the side of the end stop assembly which faces the valve member and the inwardly stepped ends of the two pieces form together a cavity which accommodates an end of the valve member when the valve member is lifted from its seated position and when said plunger is actuated to move the pieces of the end stop assembly apart from each other.

In yet another preferred embodiment, the apparatus of controlling the lift of the valve member comprises two pieces which each comprise an outwardly stepped end on the side of the end stop assembly which faces the valve member, such that when the plunger is not actuated and when said valve member is lifted to from its seated position, said outwardly stepped ends fit into a cavity provided in an end of the valve member which comes into contact with said end stop assembly.

In another preferred embodiment, the valve member is an outwardly opening valve member that can be moved away from its seat to allow fluid flow between its surface and the valve housing and the apparatus for controlling the lift of the valve member comprises two pieces, each of the pieces comprising an inwardly stepped profile. The inwardly stepped profiles of said pieces form together a cavity which can accommodate an end of the valve member and they form together at least two surfaces that come into contact with the valve member when the valve member is actuated, to allow at least two discrete lifts.

In preferred embodiments, the plunger is actuated by an electromagnetic actuator. The plunger can be moved by the actuator along the center axis of the end stop assembly or along an axis that is offset from the center axis of the end stop assembly.

In yet another preferred embodiment, the end stop assembly comprises two separate pieces which are hinged together at one side.

In preferred embodiments, the biasing members which urge the pieces of the end stop assembly towards the interposing end of the plunger are elastic elements, for example springs.

The end of the plunger which is interposed between the pieces of the end stop assembly has preferably a conical shape to diminish the friction between the plunger and the pieces when the plunger is actuated and moves the pieces apart from each other.

In preferred embodiments, the flow control valve that comprises the described apparatus for controlling the valve lift is a fuel injection valve. In such valves, the valve member is actuated by a first actuator and the plunger is actuated by a second actuator. Both first and second actuators are preferably electromagnetic actuators, comprising an electromagnetic coil.

In other embodiments, the valve member is actuated by an electromagnetic actuator and the plunger is connected to a structure comprising a permanent magnet that is interposed in the magnetic field of the electromagnetic actuator which actuates the valve member, whereby the structure that is connected to the plunger is moved under the action of the magnetic field of the electromagnetic actuator to thereby move the plunger.

Other flow control valves which control the flow rate of a fluid between two discrete values can use the present apparatus for controlling the lift of a valve member. In such flow control valves, the valve member is actuated by a first actuator and the plunger is actuated by a second actuator, both actuators being preferably electromagnetic actuators comprising an electromagnetic coil. In other embodiments of such flow control valves, the valve member can be actuated by an electromagnetic actuator and the plunger is connected to a structure comprising a permanent magnet that is interposed in the magnetic field of the electromagnetic actuator which actuates the valve member whereby the structure comprising the permanent magnet is moved under the action of the magnetic field of the electromagnetic actuator to thereby move the plunger.

A method is disclosed for controlling the lift of a valve member in a flow control valve, the method comprising actuating a plunger whose one end is interposed between the two pieces of an end stop assembly to move the two pieces from a first position in which the pieces form a first surface that comes into contact with to the valve member to allow a first lift L1 of the valve member to a second position in which the pieces of the end stop assembly form a second surface that comes into contact with the valve member to allow a second lift L2 of the valve member.

In yet another embodiment of the present method of controlling the lift of a valve member, the plunger is further moved to a third position in which the pieces of the end stop assembly form a third surface that comes into contact with the valve member to allow a third lift L3 of the valve member when the valve member is lifted from its seated position.

BRIEF DESCRIPTION OF THE DRAWINGS

The drawings illustrate specific preferred embodiments of the invention, but should not be considered as restricting the spirit or scope of the invention in any way.

FIGS. 3A and 3B illustrate the operation of the second embodiment of the end stop assembly in which each of the two pieces of the end stop assembly has an outwardly stepped end, each figure illustrating a position of the end stop assembly for allowing a different lift of the valve member;

FIGS. 5A and 5B illustrate the operation of the fourth embodiment of the end stop assembly wherein the plunger is connected to a structure comprising a permanent magnet which is moved by the magnetic field generated by the electromagnetic actuator which lifts the valve member, each figure illustrating a position of the end stop assembly for allowing a different lift of the valve member;

FIG. 6 represents a diagram of the current supplied to the electromagnetic actuator of the embodiment illustrated in FIG. 6;

FIGS. 7A, 7B and 7C illustrate the operation of the fifth embodiment of the end stop assembly which achieves three different lifts of the valve member, each figure illustrating a position of the end stop assembly for allowing a different lift of the valve member;

DETAILED DESCRIPTION OF THE PREFERRED EMBODIMENTS

The apparatus for controlling the lift of the valve member illustrated in the preferred embodiments can be used in any flow control valve where the fluid flow rate of the fluid exiting the valve outlet is adjusted between two discrete values by lifting a valve member from its seated position to two discrete open positions. An example of such a valve is a fuel injection valve which can be disposed within the cylinder head with the valve nozzle protruding into the combustion chamber such that fuel is injected directly into the combustion chamber or, in other engines, the fuel injection valve can be positioned such that it injects fuel into an intake port associated with a combustion chamber, or into the air intake manifold. Such a fuel injection valve is schematically illustrated in FIG. 1.

To simplify the illustration of the internal fluid passages within flow control valves, the schematic illustrations in the figures show mainly the valve member of the flow control valve and the apparatus for controlling the lift of the valve member. In an actual working arrangement other components such as the valve body, the fluid inlet for supplying a fluid whose flow rate is regulated by the valve, the fluid outlet for and other internal fluid passages can be employed within the valve body in an operatively equivalent structure.

Figure 1:
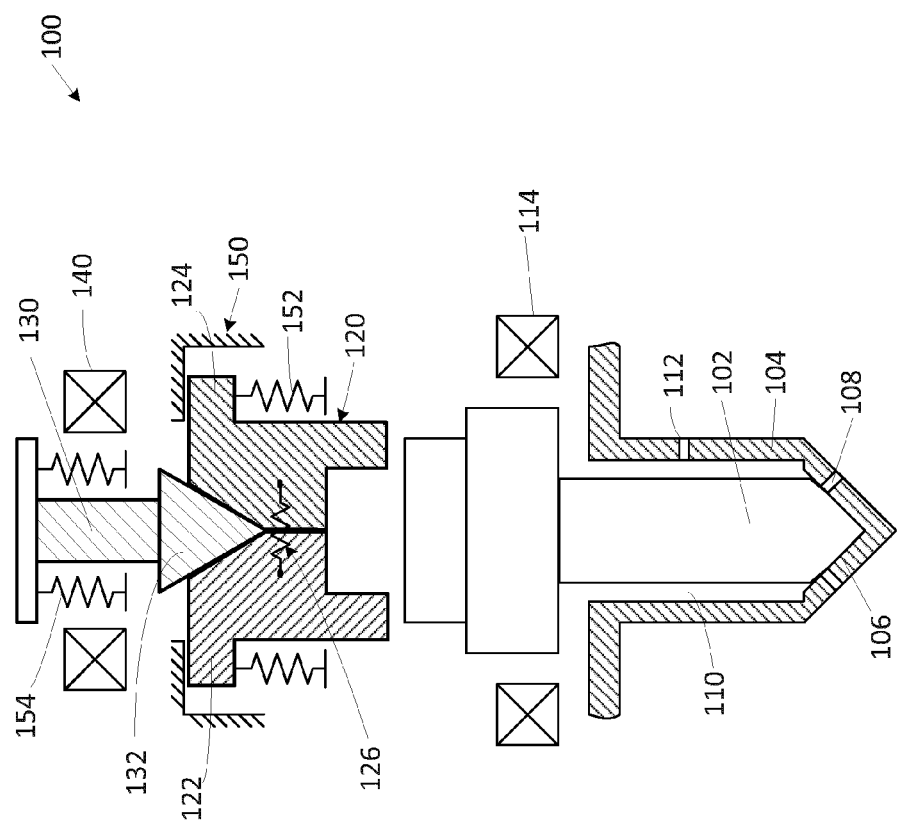
FIG. 1 is a schematic sectional view of a fuel injection valve illustrating the first embodiment of an end stop assembly that can be actuated by an electromagnetic actuator to allow different discrete lifts of the valve member.

Referring to the drawings, FIG. 1 shows a schematic sectional view of a fuel injection valve illustrating the first embodiment of an apparatus for controlling the lift of a valve member comprising an end stop assembly and a plunger that can be actuated by an electromagnetic actuator to allow different lifts of the valve member. Fuel injection valve 100 comprises valve member 102 which is positioned in lower housing 104 and can be lifted away from valve seat 106 to thereby open orifices 108 for allowing the injection of fuel from fuel cavity 110. Fuel is supplied through fuel inlet 112 to fuel cavity 110. Valve member 102 is lifted by actuating a first actuator 114, which in this embodiment is illustrated as the coil of an electromagnetic actuator.

FIG. 1 further illustrates the apparatus for controlling the lift of valve member 102 which comprises end stop assembly 120, plunger 130 and second actuator 140. In the present embodiment second actuator 140 is illustrated as the coil of an electromagnetic actuator. End stop assembly 120 comprises two pieces 122 and 124. One end 132 of plunger 130 is interposed between the two pieces 122 and 124. Biasing members 126 urge pieces 122 and 124 into contact with end 132 of plunger 130. The two pieces of the end stop assembly 120 are maintained in contact with the upper housing 150 of the valve by springs 152. This has the advantage that the pieces of the end stop assembly 120 are kept permanently in contact with the solid, stable surface of the upper housing even when the pieces are moved during the activation of plunger 130, and when valve member 102 is lifted away from seat 106 and comes into contact with end stop assembly 120. This allows a more stable and accurate lift of the valve member.

Figures 2A, 2B:
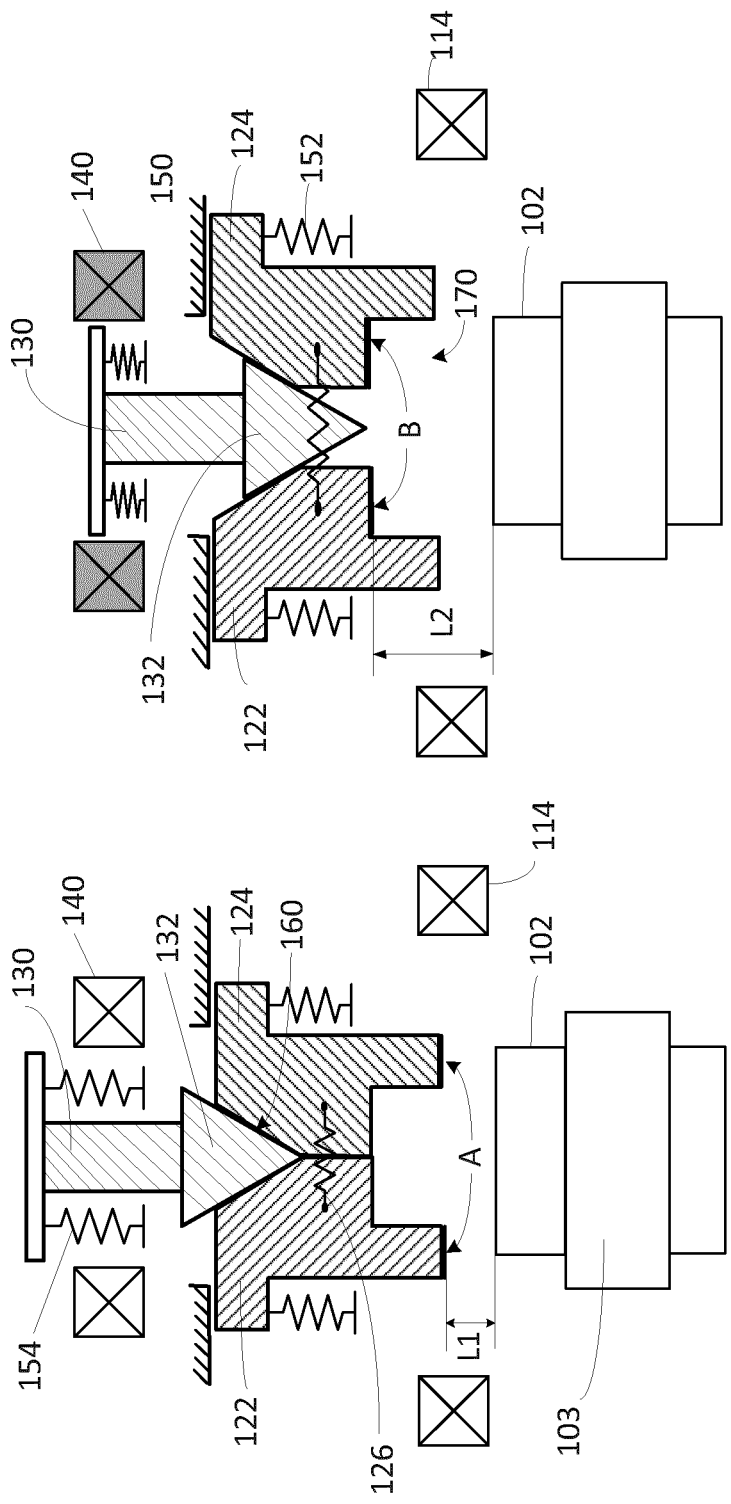
FIGS. 2A and 2B illustrate the operation of the first embodiment of the end stop assembly shown in FIG. 1, each figure illustrating a position of the end stop assembly for allowing a different lift of the valve member.

Valve 100 operates as illustrated in FIGS. 2A and 2B. As shown in FIG. 2A, when second actuator 140 is not activated, plunger 130 is pushed upwards by springs 154 and takes a first position in which end 132 of plunger 130 is interposed between pieces 122 and 124 of end stop assembly 120 in cavity 160 formed by pieces 122 and 124 which are biased towards plunger 132 by biasing members 126. This first position of plunger 130 determines a first position of end stop assembly 120 in which the ends of pieces 122 and 124, which face valve member 102, form a first surface A with which valve member 102 comes into contact when moved by first actuator 114.

This position of end stop assembly allows a lift L1 of valve member 102.

Valve member 102 comprises a portion 103 which is constructed as an armature so that valve member 102 is moved between its seated and its lifted position when the armature interacts with the magnetic field generated by the electromagnetic coil of first actuator 114 which is an electromagnetic actuator.

Plunger 130 also comprises an armature that interacts with second actuator 140 or is constructed in its entirety as an armature that interacts with the magnetic field generated by second actuator 140 which is an electromagnetic actuator. When second actuator 140 is activated, plunger 130 is pushed downwards in a second position, illustrated in FIG. 2B. End 132 of plunger 130 descends further between pieces 122 and 124 of end stop assembly 120 and thereby pushes these pieces apart from each other, bringing the end stop assembly to a second position in which pieces 122 and 124 form a second surface B. When first actuator 114 is activated, valve member 102 is moved from its seated position to a lifted position until the end of valve member 102 comes into contact with surface B. In this lifted position, one end of valve member 102 is accommodated in a cavity 170 formed by the inwardly stepped ends of pieces 122 and 124. This second position of end stop assembly allows a lift L2 of valve member 102, which is greater than L1.

When pushed apart by plunger 130, pieces 122 and 124 maintain contact with upper housing 150 of the valve under the action of springs 152, such that when the end of valve member comes into contact with surface B, the movement of the valve member is firmly stopped and there are no vertical oscillations in the valve member position. This is an advantage over the existing prior art employing a movable stop actuated by an electromagnetic actuator described in German patent application number 1911827.

As illustrated in FIGS. 2A and 2B, the present apparatus for controlling the lift of a valve member in a flow control valve operates more accurately to allow two different distinct lifts L1 and L2 of the valve member by using a simple method of controlling an electromagnetic actuator which moves the plunger from a first position to a second position.

In preferred embodiments, end 132 of plunger 130 has a conical shape to allow for a smooth transition of end assembly 120 from the first position into a second position and diminish the friction between pieces 122, 124 and end 132 of the plunger. Plunger 130 is preferably moved by actuator 140 along the center axis of the end stop assembly, but the housing of the flow control valve can also be constructed to accommodate the movement of plunger 130 along an axis that is offset from the center axis of the end stop assembly 120. In this variant, the friction between pieces 122, 124 and plunger 130 is further diminished because less force is required to actuate the plunger.

Other embodiments of the apparatus for controlling the lift of the valve member of a flow control valve are further described below. These embodiments have many components that are equivalent to like components of the embodiment presented in FIGS. 1, 2A and 2B and like components are identified by like reference numbers. In this disclosure like-numbered components function in substantially the same way in each embodiment. Accordingly, if like components have already been described with respect to one embodiment, while identified in the figures for other embodiments, the purpose and function of like components may not be repeated for each of the illustrated embodiments.

FIGS. 3A and 3B illustrate the operation of the second embodiment of the present apparatus of controlling the lift of the valve member in a flow control valve 200. The apparatus for controlling the lift of valve member 202 comprises end stop assembly 220, plunger 230 and second actuator 240 which is illustrated as the coil of an electromagnetic actuator. End stop assembly 220 comprises two pieces 222 and 224. One constructional difference of this second embodiment compared with the first embodiment is that pieces 222 and 224 each have an outwardly stepped end, facing the valve member within the housing of valve 200 and that one end of valve member 202 forms a cavity 280 which can accommodate the ends of pieces 222 and 224 when plunger 230 takes a first position as illustrated in FIG. 3A as further explained below.

Valve 200 operates as illustrated in FIGS. 3A and 3B. As shown in FIG. 3A, when second actuator 240 is not activated, plunger 230 is pushed upwards by springs 254 to a first position and pieces 222 and 224 of end stop assembly 220 are biased towards plunger 230 by biasing members 226 such that the ends of pieces 222 and 224 which face valve member 202 form a surface C with which surface D of one end of valve member 202 comes into contact when the valve member is moved by first actuator 214. In this position ends of pieces 222 and 224 can be accommodated in cavity 280 provided in the end of valve member 202. This position of the end stop assembly allows a lift L1 of the valve member.

When second actuator 240 is activated, plunger 230 is pushed downwards in a second position. As illustrated in FIG. 3B, end 232 of plunger 230 descends further between pieces 222 and 224 of end stop assembly 220 and thereby pushes these pieces apart from each other, bringing the end stop assembly to a second position in which pieces 222 and 224 form a surface E. When first actuator 214 is activated, valve member 202 is moved from its seated position to a lifted position until surface F of one end of valve member 102 comes into contact with surface E formed by the ends of pieces 222 and 224. This second position of end stop assembly allows a lift L2 of valve member 202, which is smaller than lift L1.

Figure 4B:
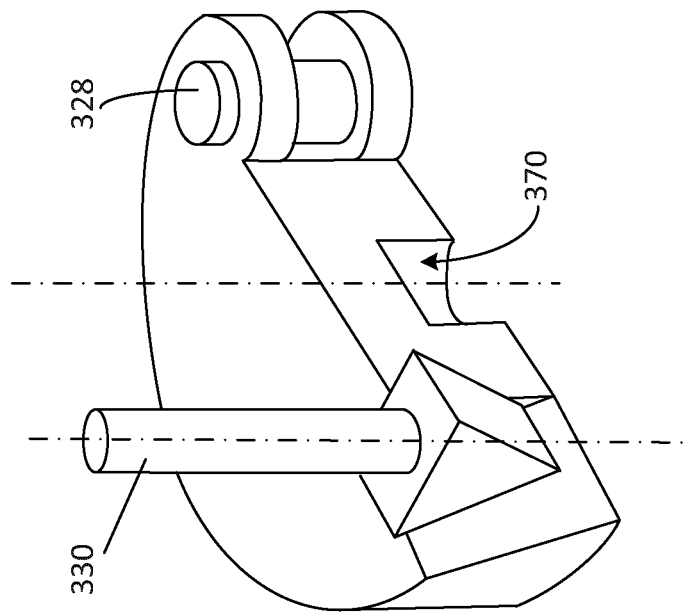
FIGS. 4A and 4B is a three-dimensional view of the third embodiment of the present end stop assembly comprising a hinged arrangement of the two pieces which constitute the end stop assembly and a plunger whose end is interposed between the two pieces.
Figure 4A:
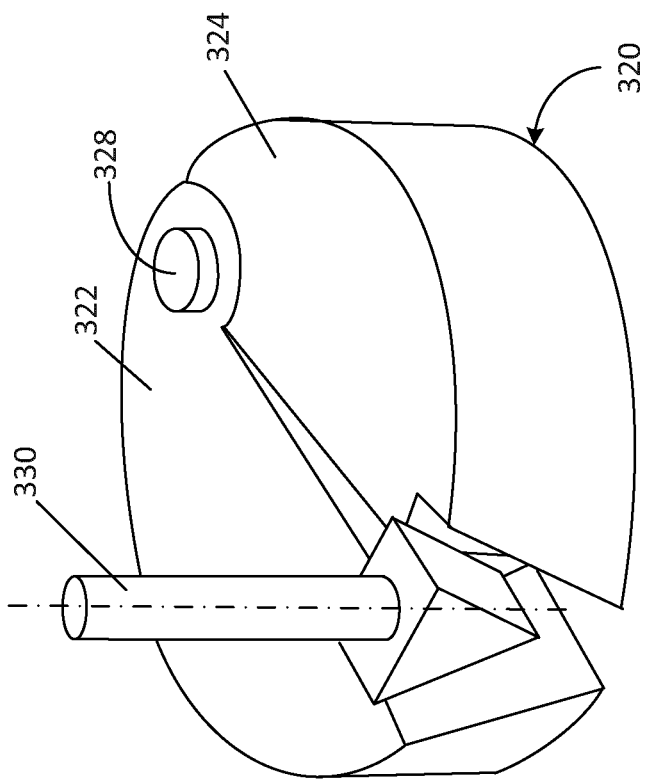

In the first and second embodiments illustrated in FIGS. 1, 2A, 2B, 3A and 3B the end stop assembly is made of two separate pieces 122, 124 and respectively 222 and 224, which are biased towards the plunger by biasing members 126 and respectively 226. The two separate pieces are not connected to each other. In the third embodiment of the present apparatus for controlling the lift of a valve member, illustrated in FIGS. 4A and 4B, the two pieces 322 and 324 which make the end stop assembly 320 are hinged on one side. Hinge element 328 connects the two pieces on one side leaving the opposite sides of the two pieces free to move under the action of plunger 330. Plunger 330 is moved by an actuator, as disclosed in relation with the previous embodiments, along an axis that is offset from the central axis of the end stop assembly. This presents the advantage that the push force required for actuating the plunger to move the two pieces laterally is smaller than the similar push force required when the plunger is positioned along the center axis of the end stop assembly and therefore the friction between the plunger and the two pieces is smaller.

In this third embodiment, the two pieces 322 and 324 have a similar construction with the pieces of the end stop assembly of the first embodiment illustrated in FIGS. 1, 2A and 2B, with a cavity 370 for accommodating the end of the valve member when the latter is lifted from its seated position. A similar hinged arrangement of the two pieces of the end stop assembly, not illustrated, can be provided for the second embodiment of the present apparatus illustrated in FIGS. 3A and 3B.

A fourth embodiment of the present apparatus for controlling the lift of a valve member is illustrated in FIGS. 5A and 5B. Valve 400 comprises end stop assembly 420 which has a similar construction with the end stop assembly of the first embodiment illustrated in FIGS. 1, 2A and 2B and the apparatus further comprises plunger 430 whose end 432 is interposed between two pieces 422 and 424 of the end stop assembly. The difference between this fourth embodiment and the previously described embodiments is that only one actuator 490 is provided for actuating both valve member 402 and plunger 430. In this fourth embodiment, plunger 430 is connected to supporting structure 492 which comprises two permanent magnets 494.

This embodiment operates based on the principle that the magnetic flux generated by a solenoid has a certain magnetic polarity. Due to the polar nature of this magnetic field, when it interacts with a permanent magnet, either an attractive or a repulsive force is generated. However, when the magnetic field interacts with a non-magnetized material, there is always an attractive force. Therefore, the magnetic field generated by actuator 490 always operates to attract armature 403 of valve member 402 to lift it from its seated position, regardless of the current flow.

On the other hand, when the current flows in one direction through the coil of actuator 490 it generates a repulsive force which pushes permanent magnets 494, supporting structure 492 and plunger 430, connected to it, away from end stop assembly as illustrated in FIG. 5A. When the direction of the current flowing through the coil of actuator 490 is reversed, it generates an attractive force which pulls permanent magnets 494, supporting structure 492 and plunger 430 towards the end stop assembly, as illustrated in FIG. 5B, and end 432 of plunger 430 descends further between pieces 422 and 424 allowing a greater lift L2 for valve member 402. Therefore in order to switch from the first position of the end stop assembly illustrated in FIG. 5A to the second position of the end stop assembly illustrated in FIG. 5B, only the direction of the current through the coil of actuator 490 needs to be reversed.

In the embodiments that employ two actuators there are independent electric circuits that control each of the two actuators, for example 114 and 140 and respectively 214 and 240. The plunger can be activated or deactivated at any time independent of the activation of the valve member. In embodiments that employ one actuator, such as the embodiment shown in FIGS. 5A and 5B, activation of actuator 490 has to be controlled such that the movement of the valve member is correlated with the movement of the plunger. Generally, the force required to move the plunger can be smaller than the force required to move the valve member, mainly because the elastic preload on the plunger is smaller compared to the elastic preload required for keeping the valve member in its seated position. Therefore, in preferred embodiments, the value of the current supplied to the coil of actuator 490 for moving plunger 430 is smaller than the value of the current supplied to the coil of actuator 490 for moving valve member 402. The movement of plunger 430 can be timed to start before the movement of valve member by controlling the current.

As illustrated in FIG. 6, in preferred embodiments, a small current 601 which is sufficient to move plunger 430 will be passed first through actuator 490. This small current is sufficient for moving plunger 430, but it is too small for moving valve member 402 from its seated position. Then a second current 605 is passed through actuator 490. Second current 605 is greater than first current 601 and is sufficient for moving valve member 402 from its seated position. Valve member 402 is moved to its lifted position after plunger 430 and end stop assembly 420 have moved to their intended positions as described in relation with the embodiments described above. When second current 605 is passed through actuator 490, the further movement of the plunger and end stop assembly beyond their intended positions is prevented by providing a stop, for example, stop 474, when spring 454 is fully compressed, or a separate stop 474' (illustrated in dashed lines) which can be designed as an integral part of the valve housing or can be fixed thereto. Current 607, smaller in amplitude than current 605 can be then passed through actuator 490, for maintaining the valve member and the plunger in their operational positions.

FIGS. 7A, 7B and 7C illustrate the operation of the fifth embodiment of present apparatus for controlling the lift of the valve member comprising an end stop assembly which allows three different discrete lifts of the valve member. This fifth embodiment utilizes a construction for the support structure of the plunger that is similar with the one illustrated in FIGS. 5A and 5B. Plunger 730 is connected to a supporting structure 792 which comprises two permanent magnets 794. The difference in the fifth embodiment compared with the fourth embodiment is that one actuator 790 is provided for actuating plunger 730 and another actuator 714 is used for moving valve member 702, which is a concept that is used in the first and second embodiments.

In a first position of end stop assembly 720, illustrated in FIG. 7A, a current is passed in a first direction through the coil of actuator 790 generating a repulsive force which pushes permanent magnets 794, supporting structure 792 and plunger 730 away from end stop assembly 720. Pieces 722 and 724 are biased towards plunger 730 and form a first surface M which comes into contact with valve member 702 when valve member 702 of valve 700 is lifted from its seated position being moved by actuator 714. As in the previous embodiments, valve member 702 comprises an armature 703 which is actuated by the magnetic field generated by electromagnetic actuator 714. Lift L1, that can be achieved by the valve member in this first position of the end stop assembly, is the distance between the end of the valve member in its seated position and surface M of the end stop assembly.

When no current is passed through actuator 790, plunger 730 descends being pushed by spring 784 placed between upper housing 750 of valve 700 and structure 792, end 732 of plunger 730 moves pieces 722 and 724 laterally and end stop assembly 720 takes a second position, illustrated in FIG. 7B. In this position, end pieces 722 and 724 form a surface N which comes into contact with the end of valve member 702 when the valve member is lifted from its seated position, which allows a lift L2 of the valve member. Valve member 702 is actuated by actuator 714 and its end is accommodated in cavity 770 formed by the inwardly stepped ends of pieces 722 and 724.

When the direction of the current passed through the coil of electromagnetic actuator 790 is reversed, the magnetic field around the coil generates an attractive force towards permanent magnets 794 and thereby moves supporting structure 792 and plunger 730 towards end stop assembly 720. End 732 of plunger 730 descends further between pieces 722 and 724 and end stop assembly is moved into a third position illustrated in FIG. 7C. Pieces 722 and 724 form a surface P which comes into contact with valve member 702 when the valve member is lifted from its seated position, being moved by actuator 714. As in the previous embodiments, valve member 702 comprises an armature 703 which is actuated by the magnetic field generated by electromagnetic actuator 714. Lift L3 that can be achieved by the valve member in this third position of the end stop assembly is the distance between the end of the valve member in its seated position and surface P of the end stop assembly. When valve member 702 is actuated by actuator 714, its end is accommodated in cavity 780 formed by the inwardly stepped ends of pieces 722 and 724.

In this fifth embodiment, the end stop assembly comprises two pieces having inwardly stepped ends which create a cavity in which the end of the valve member can be accommodated when the valve member is lifted from its seated position and comes into contact with the surface created by the ends of the two pieces. A similar arrangement with the one presented in FIGS. 7A, 7B and 7C can comprise an end stop assembly having two pieces provided with outwardly stepped ends similar to the construction illustrated in FIGS. 3A and 3B. In this variant, the cavity formed in the end of the valve member is preferably stepped to create cavities of different diameters which can accommodate the outwardly stepped ends of the two pieces of the end stop assembly.

Figure 8:
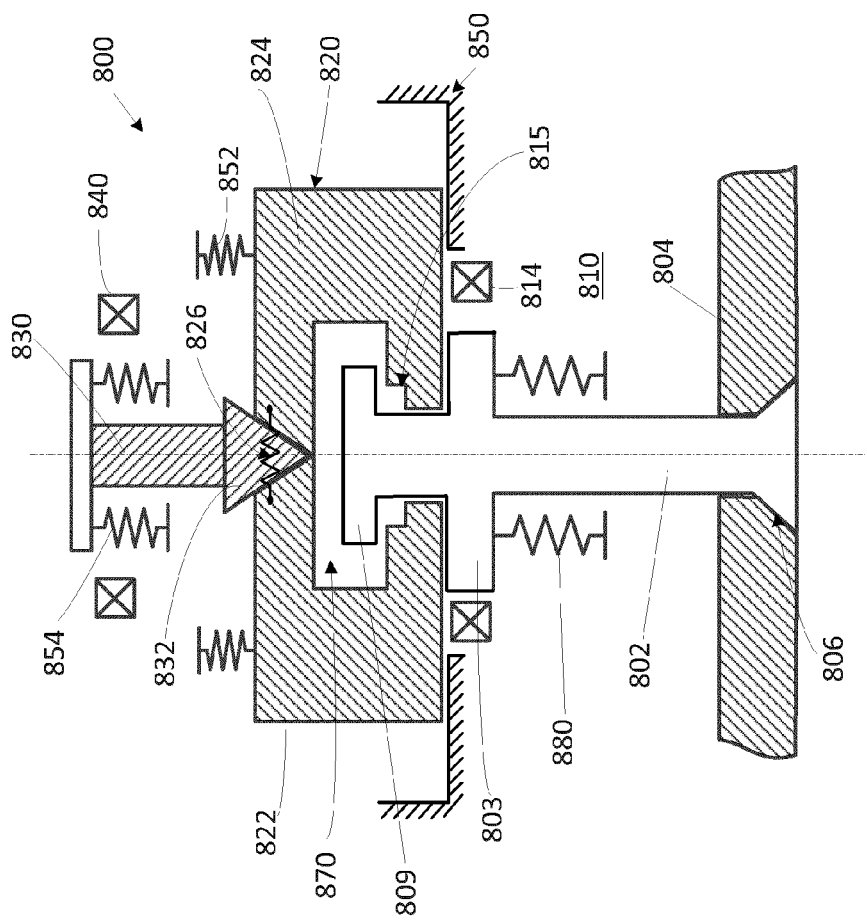
FIG. 8 illustrates a schematic sectional view of an outwardly opening fuel injection valve and an embodiment of the end stop assembly that can be actuated by an electromagnetic actuator to allow different discrete lifts of the outwardly opening valve member.

FIG. 8 shows another embodiment of the present apparatus for controlling the lift of an outwardly opening valve member of a flow control valve. In the embodiments presented in FIGS. 1 to 7 the flow control valve is illustrated as comprising an inwardly opening valve member which is lifted from the valve seat by an actuator to thereby open the flow orifices of the flow control valve for allowing fluid flow. In these embodiments when the valve member is lifted from its seat, it moves inside the fluid holding cavity. Other types of flow control valves use outwardly opening valve members, which, when actuated, are moved away from the valve seat and from the fluid holding cavity to allow fluid flow between the valve member and the valve seat.

Such a valve comprising an outwardly opening valve member is the fuel injection valve 800 illustrated as an example in FIG. 8. Fuel injection valve 800 comprises valve member 802 which is positioned in valve housing 804 and can be moved away from valve seat 806 to thereby allow the injection of fuel from fuel cavity 810 through the space created between the valve member 802 and seat 806. Valve member 802 is moved by actuating a first actuator 814.

The apparatus for controlling the lift of valve member 802 comprises end stop assembly 820, plunger 830 and second actuator 840. In the present embodiment each of first and second actuators is illustrated as a coil of an electromagnetic actuator. End stop assembly 820 comprises two pieces 822 and 824 and one end 832 of plunger 830 is interposed between the two pieces 822 and 824. End pieces 822 and 824 each comprise an inwardly stepped profile 815 and form together a cavity 870 which accommodates end 809 of valve member 802. End stop assembly 820 is housed in upper housing 850 such that the two pieces of the end stop assembly 820 are pushed by springs 852 to be maintained in contact with the walls of upper housing 850 even when the two pieces 822 and 824 are moved by end 832 of the plunger in a horizontal direction and apart from each other. This has the advantage that the pieces of the end stop assembly 820 are kept permanently in contact with the solid, stable surface of the upper housing even when the pieces are moved during the activation of plunger 830, and when valve member 802 is moved away from seat 806 and comes into contact with end stop assembly 820. This allows a more stable and accurate lift of the valve member.

Figures 9A, 9B:
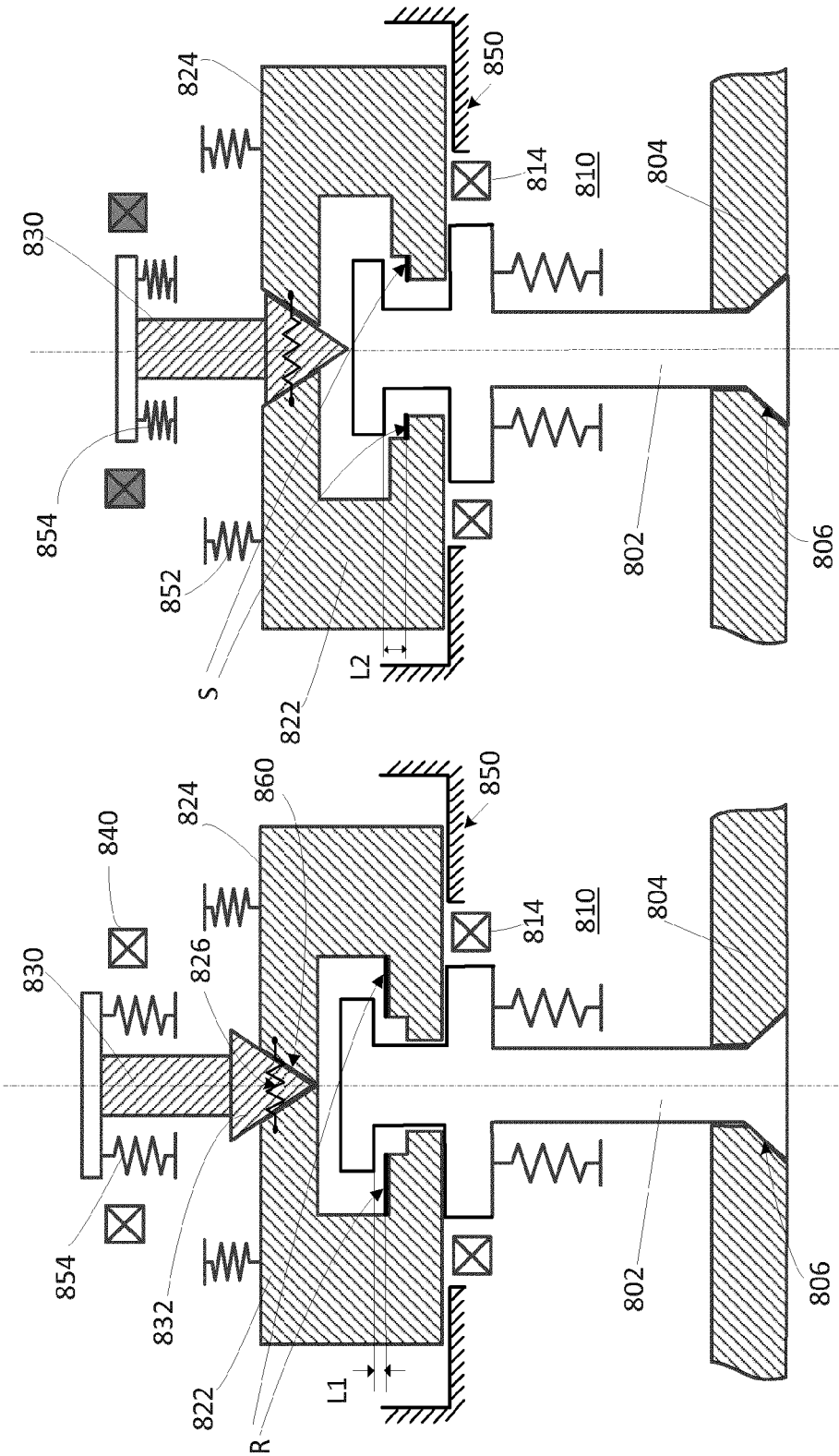
FIGS. 9A and 9B illustrate the operation of the embodiment of the end stop assembly shown in FIG. 8, each figure illustrating a position of the end stop assembly for allowing a different lift of the outwardly opening valve member.

Valve 800 operates as illustrated in FIGS. 9A and 9B. As shown in FIG. 9A, when second actuator 840 is not activated, plunger 830 is pushed upwards by springs 854 and takes a first position in which end 832 of plunger 830 is interposed between pieces 822 and 824 of end stop assembly 820 in a cavity 860 formed by pieces 822 and 824 which are biased towards plunger 832 by biasing members 826. This first position of plunger 830 determines a first position of end stop assembly 820. In this position valve member 802 comes into contact, when moved by first actuator 814, with surface R formed by the two pieces of the end stop assembly. This position of end stop assembly allows a lift L1 of valve member 802.

Valve member 802 comprises a portion 803 which is constructed as an armature so that valve member 802 is moved when the armature interacts with the magnetic field generated by the electromagnetic coil of first actuator 814 which is an electromagnetic actuator.

Plunger 830 also comprises an armature that interacts with second actuator 840 or is constructed in its entirety as an armature that interacts with the magnetic field generated by second actuator 840 which is an electromagnetic actuator. When second actuator 840 is activated, plunger 830 is pushed downwards in a second position, illustrated in FIG. 9B. End 832 of plunger 830 descends further between pieces 822 and 824 of end stop assembly 820 and thereby pushes these pieces apart from each other, bringing the end stop assembly to a second position. When first actuator 814 is activated, valve member 802 is moved away from seat 806 until the end of valve member 802 comes into contact with surface S formed by the two pieces of the end stop assembly. This second position of end stop assembly allows a lift L2 of valve member 102, which is greater than L1.

When pushed apart by plunger 830, pieces 822 and 824 maintain contact with upper housing 850 of the valve under the action of springs 852, such that when the end of valve member comes into contact with surface S, the movement of the valve member is firmly stopped and there are no vertical oscillations in the valve member position. This is an advantage over the existing prior art.

In the embodiment illustrated in FIGS. 8, 9A and 9B inwardly stepped profiles 815 of pieces 822 and 824 comprise only one step which thereby allows only two discrete lifts ($L_1$ and $L_2$) of the valve member corresponding to surfaces R and S. It is understood that inwardly stepped profiles 815 can comprise more than one step which would allow more than two support surfaces for valve member 802 when it is actuated by actuator 814 to thereby allow more than two discrete lifts.

In the preferred embodiments of the present apparatus described above, the end stop assembly is shown as comprising two pieces. Instead of just two pieces the end stop assembly can comprise multiple pieces which are all connected to each other and are biased towards the interposed end of the plunger through biasing members. Such a variant will allow more flexibility when customizing the design of the end stop assembly for a specific configuration of the valve housing.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

I claim:

1. A method of controlling the lift of a valve member in a flow control valve that includes an end stop assembly having one side that faces said valve member and comprises two pieces, a plunger with one end interposed between said pieces and biasing members urging said pieces into contact with said plunger, the method comprising actuating said plunger to move said pieces from a first position in which said pieces form a first surface that contacts said valve member to allow a first lift L1 of said valve member to a second position in which said pieces form a second surface that contacts said valve member to allow a second lift L2 of said valve member.

2. The method of claim 1, wherein said plunger is further actuated to move said pieces to a third position in which said pieces form a third surface that contacts said valve member to allow a third lift L3 of said valve member.

3. An apparatus for controlling the lift of a valve member in a flow control valve comprising an end stop assembly having one side that faces said valve member, said end stop assembly comprising two pieces, a plunger with one end interposed between said pieces and biasing members urging said pieces into contact with said plunger, wherein said plunger is actuated to move said pieces from a first position to a second position, wherein in said first position said pieces of said end stop assembly form a first surface that comes into contact with said valve member to allow a first lift L1 of said valve member and in said second position said pieces form a second surface that comes into contact with said valve member to allow a second lift L2 of said valve member.

4. The apparatus of claim 3, wherein said plunger is actuated to move said pieces of said end stop assembly to a third position in which said pieces form a third surface that comes into contact with said valve to allow a third lift L3 of said valve member.

5. The apparatus of claim 3, wherein each of said pieces has an inwardly stepped end on said side of said end stop assembly which faces said valve member and the inwardly stepped ends of said pieces form together a cavity which can accommodate an end of said valve member when said valve member is lifted from its seated position and when said plunger is actuated to move said pieces.

6. The apparatus of claim 3, wherein each of said pieces comprises an outwardly stepped end on the side of said end stop assembly which faces said valve member such that said outwardly stepped ends fit into a cavity provided in an end of said valve member which comes into contact with said end stop assembly when said valve member is lifted from its seated position and when said plunger is not actuated.

7. The apparatus of claim 3, wherein each of said pieces comprises an inwardly stepped profile and said inwardly stepped profiles of said pieces form together a cavity which can accommodate an end of said valve member and wherein said inwardly stepped profiles of said pieces form together at least two surfaces that come into contact with said valve member when said valve member is actuated, to allow at least two discrete lifts of said valve member.

8. The apparatus of claim 3, wherein said plunger is actuated by an electromagnetic actuator.

9. The apparatus of claim 3, wherein said plunger is moved by an actuator along the center axis of said end stop assembly.

10. The apparatus of claim 3, wherein said plunger is moved by an actuator along an axis that is offset from the center axis of said end stop assembly.

11. The apparatus of claim 3, wherein said end stop assembly comprises two separate pieces which are hinged together at one side.

12. The apparatus of claim 3, wherein said biasing members are springs.

13. The apparatus of claim 3, wherein said end of said plunger which is interposed between said pieces has a conical shape.

14. A flow control valve comprising a valve housing having a fluid inlet and a fluid outlet with a valve member disposed therebetween; and an end stop assembly having one side that faces said valve member, said end stop assembly comprising two pieces, a plunger with one end interposed between said pieces and biasing members urging said pieces into contact with said plunger, wherein said plunger is actuated to move said pieces from a first position to a second position, wherein in said first position said pieces of said end stop assembly form a first surface that comes into contact with said valve member to allow a first lift of said valve member from a valve seat and in said second position said pieces form a second surface that comes into contact with said valve member to allow a second lift of said valve member from said valve seat.

15. The flow control valve of claim 14, wherein said valve member is actuated by a first actuator and the plunger is actuated by a second actuator.

16. The flow control valve of claim 15, wherein said first and said second actuators are electromagnetic actuators.

17. The flow control valve of claim 15, wherein said flow control valve is a fuel injection valve.

18. The flow control valve of claim 14, wherein said valve member is actuated by an electromagnetic actuator and the plunger is connected to a structure comprising a permanent magnet that is interposed in the magnetic field of said electromagnetic actuator whereby said structure is moved under the action of said magnetic field to thereby move said plunger.

19. The flow control valve of claim 18, where the flow control valve is a fuel injection valve.

20. The flow control valve of claim 14, wherein the flow control valve is a fuel injection valve.

* * * * *